Patented June 22, 1937

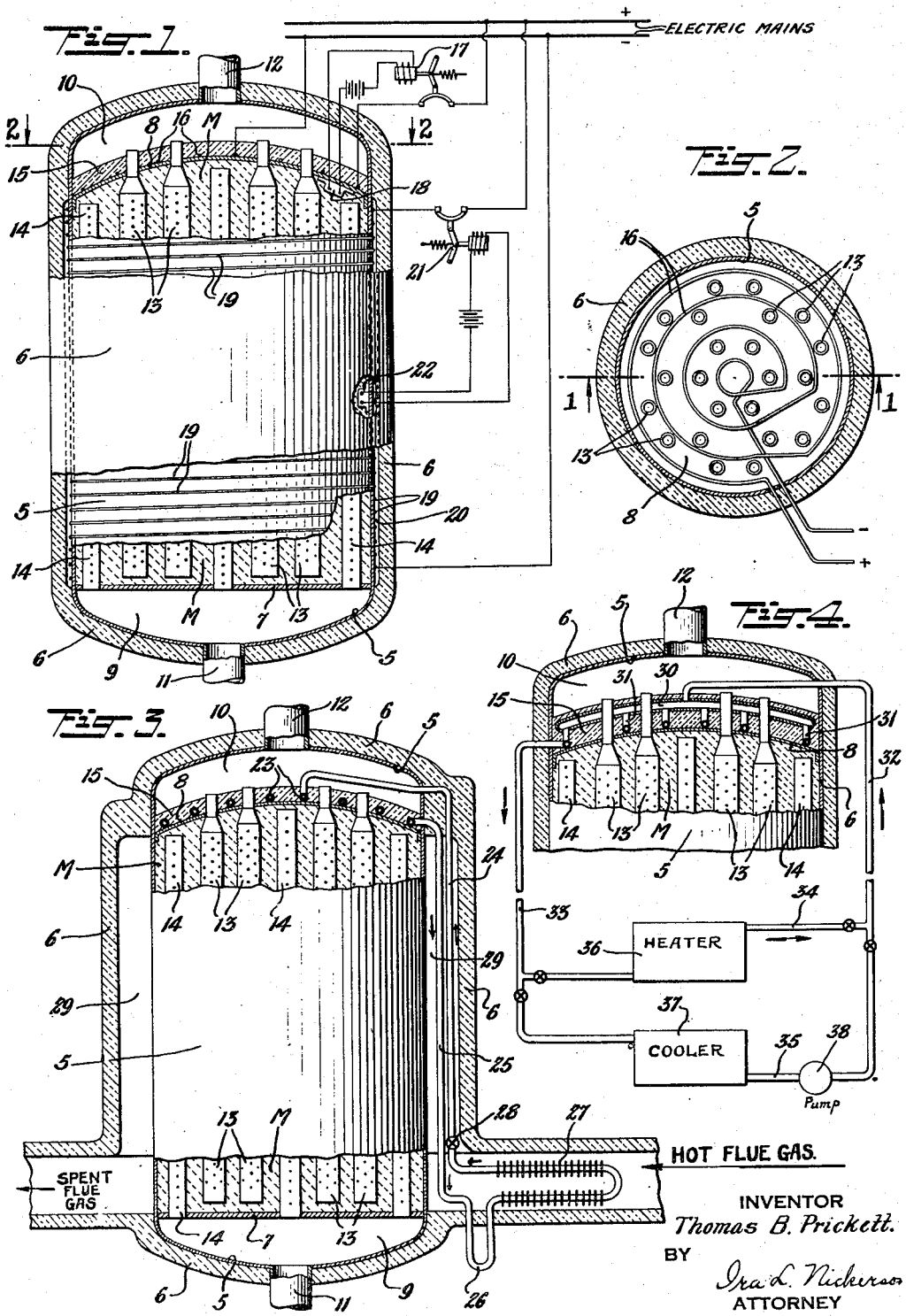

2,084,357

UNITED STATES PATENT OFFICE 2,084,357

PROCESS OF AND APPARATUS FOR CONTROLLING CATALYTIC AND OTHER CONTACT MASS REACTIONS

Thomas B. Prickett, Woodbury, N. J., assignor to Houdry Process Corporation, Dover, Del., a corporation of Delaware Application February 10, 1934, Serial No. 710,612

30 Claims. (Cl. 23—288)

This invention relates to chemical reactions, both endothermic and exothermic, effected with, on, or in the presence of solid contact masses which may be mere spreading material, or may take part in the chemical reaction, or may have purely a catalytic operation, or may combine some or all of these functions.

In the operation of catalytic converters, difficulties are often encountered due to the tendency of a part or parts of the contact mass to be at or to reach a temperature other than that which is selected as most desirable for the particular reaction. Such an undesirable temperature may be either too high or too low, depending upon the type and character of the reaction and upon operating conditions either general or peculiar to the apparatus used. If the local temperature variation is too great it may run so high as to impair or even to destroy the activity of the catalytic mass; if it is too low the reaction may cease entirely, at least, for that part of the mass which is directly concerned. While the conductivity of the apparatus plays some part at all times in the problem of temperature variation, the difficulty is most serious when the reactant or other fluids are brought into heat exchange relation with the mass at a temperature other than the temperature of reaction, especially when the temperature of the fluid is considerably above or below the reaction temperature. The last named condition is likely to occur when the reaction is strongly exothermic and when control is effected by admitting the reactant or other controlling fluid at a low temperature, as in the synthesis of ammonia by the use of a catalyst, or in the regeneration of a contact mass by oxidation after fouling resulting from a transforming operation on hydrocarbon material such as a mineral oil, or a distillate or residue thereof.

The invention involves the application to or removal of heat from portions of the converter adjacent to those parts of the contact mass, the temperature of which tends to get out of line with the optimum temperature or with that obtaining in the remainder of the mass. In a converter providing an apertured partition between the reaction chamber and a chamber for fluid, or providing a tube sheet, or the equivalent, for supporting fluid distributing or other conduits extending into the contact mass, heat may be imparted to or removed from such partition or tube sheet to control the temperature of the mass immediately adjacent thereto. The temperature regulation may be arranged to apply to all the walls of the reaction chamber together or individually and to the same extent or otherwise. The same or different temperature controlling mediums may be used, and heat may be transferred from one medium to another as desired.

In order to illustrate the invention, concrete embodiments thereof are shown in the accompanying drawing, in which:

Fig. 1 shows a converter with its central portion in side elevation, adjacent portions being cut away to show the encircling heating element, and the extreme upper and lower sections in vertical section substantially on the line 1—1 of Fig. 2;

Fig. 2 is a transverse sectional view substantially on the line 2—2 of Fig. 1, showing the insulating material removed from the top tube sheet;

Fig. 3 is a view partly cut away to show the converter case partly in side elevation and partly in vertical section, as in Fig. 1, but disclosing a modified heating arrangement; and Fig. 4 is a vertical sectional view of the upper portion of the converter showing a modified form of temperature regulating element for the top tube sheet and circuit connections adapted to use a fluid medium either for heating or for cooling.

The converter disclosed in the drawing as typical of the use of the invention comprises a case or shell 5 enclosed by a thick layer of heat insulating material 6 and having partitions 7 and 8 adjacent the lower and upper portions of the case dividing the same into a central reaction chamber containing a contact mass M and lower and upper fluid chambers 9 and 10, respectively. Either of the fluid chambers may be used at will as the inlet for fluids about to undergo treatment or transformation and the other as the outlet for the converted products, and each chamber has a fluid connection 11 and 12, respectively. Partitions 7 and 8 are perforated or otherwise arranged for the passage of fluids, and either or both of them may support perforated elements or conduits embedded in the contact mass in the reaction chamber for distributing fluids uniformly throughout the mass, or for removing the fluid products at a plurality of points within the mass, or for both distribution of reactant fluids and removal of products. In the form shown, upper partition 8 serves as a tube sheet supporting a series of fluid distributing units 13, which, for the transformation of hydrocarbons, would preferably be of the nested conduit type such as disclosed in the copending applications of Eugene Houdry, Serial No. 569,530, filed October 17, 1931, which issued January 15, 1935, as Patent No.

1,987,903, and Serial No. 611,363, filed May 14, 1932, which issued as Patent No. 1,987,904, and in the copending application of myself and Eugene Houdry, Serial No. 612,222, filed May 19, 1932, which issued as Patent No. 1,987,636. Lower partition 7 is also shown as a tube sheet supporting perforated conduits 14, either of the single or nested conduit type, the two series of conduits being arranged for localized movement of fluid through the mass in parallel planes, after the manner disclosed in the copending application of Eugene Houdry, Serial No. 611,362, which issued on June 2, 1936, as Patent No. 2,042,468 filed May 14, 1932. The fluid chamber serving as the inlet, such as chamber 10, may have a thick layer of insulating material 15 covering the adjacent partition or tube sheet such as 8, to check transfer of heat to or from the reaction chamber and contact mass M.

In spite of insulating material 15, the adjoining tube sheet or partition such as 8 often reaches a temperature out of line with that of the reaction temperature desired in mass M, and this temperature difference adversely affects the adjacent layer of the contact mass. To avoid this difficulty, it is proposed to modify the temperature of such partition or tube sheet by the provision of a temperature modifying element in contact therewith. While the element may be attached to or mounted upon either the lower or the upper face of the partition, as a matter of convenience and accessibility it is disclosed in all the figures of the drawing as applied to the upper sheet. By reason of the conductivity of the converter shell, it may be necessary also to add heat, at least during endothermic reactions, to the wall surrounding the reaction chamber. It is also within the scope of the invention to utilize a temperature modifying element in connection with the lower partition or tube sheet 7, although no such arrangement is shown because it merely involves duplication.

In the form shown in Figs. 1 and 2, the upper partition or tube sheet 8 is arranged to be heated by an electrical element 16 in the form of a coil on the upper face of the partition, as indicated in Fig. 2, the element being immediately adjacent the partition and beneath the layer of heat insulating material 15 so as to confine the application of heat primarily to the partition or tube sheet. Any suitable means may be provided for automatically controlling the quantity or time of application of heat, as, for example, a solenoid switch 17 controlled by thermal means such as thermocouple 18 in contact with the under face of partition 8 or in the upper layer of contact mass M. A separate heating element 19 may be utilized for the side wall of the reaction chamber, this element being coiled about the same, as indicated in Fig. 1. A shallow chamber 20 may be provided in the insulating layer 6 to accommodate element 19, and automatic control may be effected also by a solenoid switch 21 operated by a thermocouple 22 embedded in the outer layer of the catalytic mass M or against the inner face of shell 5.

In Fig. 3, the heating element for the upper partition or top tube sheet 8 takes the form of a fluid conduit 23 adjacent the partition and embedded in the insulating material 15. Conduit 23 may be disposed in a coil after the manner of electric heating element 16 shown in Fig. 2, or in any other suitable arrangement. The heating circuit comprises an ascending conduit section 24 connected to the upper portion of coil 23, and a descending conduit section 25 leading from the lower portion of coil 23. Section 25 leads to a trap 26 followed by a heating section 27 which connects with the ascending section 24. Any suitable means may be provided for applying heat to heating section or coil 27. The vaporized heating medium, such as water, diphenyl, mercury, or the like, upon vaporization, passes through section 24 to the top of the coil, where the giving up of heat to the partition and to the upper layer of contact mass M causes the vapors to condense and return to the heater through descending section 25 and trap 26. Trap 26, with or without the use of a throttling device such as valve 28 in the ascending section 24, permits the heating circuit to be operated under any desired pressure so as to control the vaporizing temperature of the heating medium.

Fig. 3 also provides a different heating arrangement for supplying heat to the surrounding wall of the reaction chamber from that shown in Fig. 1. The shallow chamber 20 of Fig. 1 is expanded into a much larger chamber 29, and hot waste gases, such as flue gas, are circulated through this chamber and around the wall of the converter case. Heating coil 27 of the heating circuit for the top tube sheet may be disposed, if desired, in the hot flue gas inlet with the result that the heat of the flue gas is transferred to the tube sheet by an entirely different medium. Inasmuch as the vapors of the liquid medium for the heating circuit cannot exceed in temperature that of the entering flue gas, the pressure control valve 28 may be dispensed with in this type of installation.

In Fig. 4, a temperature regulating element for the top tube sheet alone is provided, the element taking the form of a reservoir 30 with depending loops 31 or a depending coil similar to that indicated in Figs. 2 and 3, but with a plurality of connections to reservoir 30, the reservoir and the loops or coil being entirely enclosed in the heating insulating layer 15. The circuit comprises a section 32 connected to the top of reservoir 30 and a section 33 connected to the lower portion of the coil or loop members 31. Sections 32 and 33 are interconnected by sections 34 and 35, either of which may be bypassed by a suitable arrangement of valves. Section 34 contains a heater 36 of any suitable or desired type, including the type of heating coil 27 indicated in Fig. 3. When connecting section 34 is in use to cause element 30, 31 to function as a heating element, the direction of movement of the heating medium will be as indicated by the arrows. To effect cooling of partition 8, section 35 is utilized, containing a cooler or condenser 37 and a pump 38. If the temperature regulating medium is a gas or in gaseous form, pump 38 will circulate it in the direction of the arrows. If the medium is condensed to liquid form by element 37, pump 38 will be used to force it to circulate in the reverse direction to that indicated by the arrows.

Many uses of the invention in the control of chemical reactions and in the operation of apparatus utilizing contact masses will be apparent to those skilled in the art. One use of which the particular apparatus disclosed in the accompanying drawing is especially adapted is in the treatment and transformation of mineral oils and distillates and residues thereof. For example, in the transformation of heavier hydrocarbons into light hydrocarbons, the contact mass M could be an activated hydrosilicate of alumina with or without the addition of active metals or metallic oxides, the mass preferably being in the form of molded pieces to facilitate regeneration in situ. For the on-stream or converting operation, which is endothermic in character, the hydrocarbons, in vaporized form, may be admitted at reaction temperature or slightly above reaction temperature by fluid connection 11 into lower chamber 9 to be distributed throughout the mass M by perforated conduits 14, the products of the reaction escaping by perforated units 13 into upper chamber 10 and thence by connection 12. The reaction would take place in the temperature range of 750° to 925° F. at substantially atmospheric pressure or at pressures somewhat above or below atmospheric. After the catalytic mass M has become contaminated by carbonaceous and tarry deposits, it must be regenerated to permit the transforming operation to be continued. Regeneration by oxidation is preferable, and, to effect it, air diluted or not with steam or flue gas is admitted by connection 12 to upper fluid chamber 9 and distributed uniformly throughout mass M at even temperature by the fluid distributing units 13, the fumes escaping through perforated conduits 14 into lower chamber 10 and thence through fluid connection 11. Since the regenerating reaction is strongly exothermic, the regenerating medium is preferably supplied at a sufficiently low temperature to absorb some of the heat of the reaction, but the mass must be maintained at a temperature above 700° F. for proper combustion of contaminants and the temperature should not rise above 1200° F., or the catalyst will be impaired or destroyed. When the regenerating fluids enter at low temperature, the part of the catalytic mass nearest the inlet must be protected against excessive loss of heat and in most instances some of the heat loss should be restored to insure satisfactory operation. For this reason, heating elements for the upper partition or tube sheet 8 are provided in addition to the layer of heat insulating material 15.

During the hydrocarbon converting or endothermic reaction, it is desirable to apply heat both to the wall of the case 5 surrounding the reaction chamber and to the upper partition 8, and ways of effecting both results are indicated in Figs. 1 and 2. Heat should be supplied to the upper partition during both the on-stream and the regenerating operations. Heating of the outer wall of the chamber may at times be dispensed with during the regenerating operation, and even during the on-stream operation in certain instances, if the outer insulating layer 6 is very efficient. In the form of apparatus shown in Fig. 2, hot flue gas may be provided in suitable quantity to maintain the outer wall of the case at a predetermined temperature, say 825° F., during the on-stream or transforming operation. If the feeding of flue gas is continued at the same rate during the regenerating operation, it will carry away some of the heat of this exothermic reaction, which is usually effected between 900° and 1100° F. If the flue gas is intended to be circulated during both operations through chamber 29 (Fig. 3), its temperature should not be lower than 700° F. If it serves as the heating medium for heating coil 27 of the circuit to the upper partition, the heat input at that point will be automatically regulated and may effect either heating or cooling, depending upon the temperature of the upper layer of catalytic mass M. If the regenerating medium is supplied at a considerably higher temperature, say 500° to 600° F. or above, cooling of the upper partition 8 as well as of the outer wall of the converter case may be necessary to maintain mass M within safe temperature limits.

It is to be understood that the invention is not limited to the particular heating and/or cooling arrangement or combinations shown in the accompanying drawing, which are intended to be illustrative only, and that the invention covers all changes, variations, and modifications within the scope of the appended claims.

I claim as my invention:

1. In a converter for effecting both endothermic and exothermic reactions, either alternately or intermittently, said converter providing a reaction chamber containing a contact mass and providing a chamber for fluids adjacent said reaction chamber but with an intervening wall or partition, the process step in the temperature regulation of said contact mass which comprises applying heat continuously to the portion of said mass adjacent said wall or partition and applying heat to other portions of said mass only during endothermic reactions.

2. In a converter providing a reaction chamber containing a contact mass and providing adjacent said reaction chamber but separate therefrom at least one additional chamber for fluid reactance or products of the reaction chamber, the reactions in said first named chamber being alternately endothermic and exothermic, the process steps in the temperature regulation of said contact mass which comprises applying heat to substantially the entire outer layer of the contact mass during the endothermic reactions and applying heat during the exothermic reactions only to the outer layer of the contact mass which is adjacent said additional chamber.

3. In a converter providing a reaction chamber containing a contact mass and providing a chamber for fluids adjacent said reaction chamber but with an intervening partition, the reactions in the first named chamber being successively endothermic and exothermic, the process steps in the temperature regulation of the contact mass which comprise applying heat differentially to the portion of said mass adjacent said partition and to the outer layer of said mass adjacent other walls of said converter during endothermic reaction, but during subsequent exothermic reaction applying heat only to the portion of said mass adjacent said partition.

4. In a converter providing two adjacent chambers with a partition dividing the same from one another, one of said chambers containing a contact mass and forming a reaction chamber, the process step in the temperature regulation of said contact mass which comprises passing flue gas at elevated temperature over the walls of the converter to modify the temperature of the layer of said mass adjacent said walls, and transferring heat from said flue gas by a vaporizable medium to the portions of said mass adjacent said partition.

5. In the conversion of hydrocarbons by a converter providing a reaction chamber containing a contact mass and adjacent separate chambers, one for the entering or reactant fluids and the other for the reaction products, a partition in the form of a tube sheet between the entering fluid chamber and the reaction chamber, fluid distributing conduits extending from the tube sheet partition into the contact mass, the process step in the temperature regulation of the contact mass which comprises applying heat to or removing heat from the tube sheet partition and the outer wall of the converter together or separately as required to maintain the portions of the contact mass adjacent said partition and outer wall within or near the temperature range of the reaction.

6. In a converter providing two adjacent chambers with a partition dividing the same from one another, one of said chambers containing a contact mass and forming a reaction chamber, the process step in the temperature regulation of said contact mass which comprises bringing a heating medium into contact with the walls of the converter to transmit heat to the adjacent layer of said contact mass, and transferring the heat of said heating medium by a second medium to the portions of the contact mass adjacent said partition.

7. In the conversion of hydrocarbons by a converter providing a reaction chamber containing a contact mass and adjacent separate chambers, one for the entering or reactant fluids and the other for the reaction products, a partition in the form of a tube sheet between the entering fluid chamber and the reaction chamber, fluid distributing conduits extending from the tube sheet partition into the contact mass, the reactions in said first named chamber being alternately endothermic and exothermic, the process steps in the temperature regulation of the contact mass which comprise applying heat to or removing heat from the tube sheet partition to maintain the adjacent layer of the contact mass at a temperature not less than 700° F., and applying heat to the outer wall of the converter which encloses the reaction chamber during the periods of endothermic reaction.

8. In the conversion of hydrocarbons by a converter providing a reaction chamber containing a contact mass and adjacent separate chambers, one for the entering or reactant fluids and the other for the reaction products, a partition in the form of a tube sheet between the entering fluid chamber and the reaction chamber, fluid distributing conduits extending from the tube sheet partition into the contact mass, the reactions in said first named chamber being alternately endothermic and exothermic, the process step in the temperature regulation of the contact mass which comprises applying heat to or removing heat from the tube sheet partition and the outer wall of the converter together or separately as required to maintain the portions of the contact mass adjacent said partition and outer wall at a temperature not less than 700° F.

9. In a converter providing a reaction chamber containing a contact mass and providing a manifolding chamber for fluids adjacent said reaction chamber, separated from the former by an intervening wall or partition, said reaction chamber being substantially completely filled with a catalytic mass, the process steps in the temperature regulation of said catalytic mass which comprises applying heat to the portion of said mass adjacent said wall or partition by applying heat to said partition in a number of confined, spaced paths, separately applying heat to the outer layer of said mass adjacent other walls of said converter through said last-named walls, separately modifying the application of heat to said partition and said walls in response to variations in temperature of respective portions of the contact mass bounded by said partition and said wall and restricting heat exchange substantially completely between said confined spaced paths and fluids in the aforesaid manifolding chamber which is adjacent to said reaction chamber so as to effect heat exchange substantially only with said partition and the mass within said reaction chamber and near said partition.

10. A converter for effecting chemical reactions comprising a case providing a reaction chamber for containing a contact mass and an adjacent chamber for fluids, a partition separating said chambers but providing passage for fluid between said chambers, means associated with the side of said partition remote from said reaction chamber for checking heat exchange between said chambers, and a temperature modifying element in direct contact with said partition.

11. A converter for effecting chemical reactions comprising a case, spaced partitions adjacent opposite ends of said case for defining a reaction chamber, a contact mass in said chamber, a temperature modifying element adjacent one of said partitions, means including said element in a circuit for a fluid medium, and means in said circuit operable at will for heating or for cooling said medium.

12. A converter for effecting chemical reactions comprising a case providing a reaction chamber for containing a contact mass, a tube sheet forming one wall of said chamber, apertured tubular members mounted on said sheet and extending into said chamber for distributing fluids in or removing fluids from the contact mass, and an element in contact with said tube sheet for applying heat to or extracting heat from the latter.

13. A converter for effecting chemical reactions comprising a case, spaced partitions adjacent opposite ends of said case for defining a reaction chamber, a contact mass in said chamber, perforated fluid distributing members mounted on one of said partitions and extending into said mass toward said other partition and means for applying heat to one of said partitions.

14. A converter for effecting chemical reactions comprising a case, spaced partitions within said case defining a reaction chamber, a contact mass in said chamber, apertured tubular members mounted on both said partitions and extending into said chamber for distributing fluids in and removing fluids from said mass, and means utilizing a medium other than the reactants or the products of the reaction for applying heat substantially uniformly to all parts of one of said partitions.

15. In apparatus for effecting chemical transformations, a converter providing a reaction chamber and an adjacent chamber for fluids, a partition separating said chambers but providing for the passage of fluid therethrough, a contact mass in said reaction chamber, tubular members mounted on said partition and extending into said chamber, and means utilizing a circulated fluid medium for applying heat to or extracting heat from said partition including an element in contact with one face of said partition.

16. In apparatus for effecting chemical transformations, a converter providing a reaction chamber and an adjacent chamber for fluids, a partition separating said chambers but providing for the passage of fluid therethrough, a contact mass in said reaction chamber, a layer of heat insulating material on the outer face of said partition, and a heating element adjacent said outer face of said partition and embedded in said layer of heat insulating material.

17. In apparatus for effecting chemical transformations, a converter providing a reaction chamber and an adjacent chamber for fluids, a partition separating said chambers, tubular members mounted on said partition and extending into said reaction chamber, a contact mass in said reaction chamber, a layer of heat insulating material on the outer face of said partition, and heating means adjacent said outer face and embedded in said layer.

18. In apparatus for effecting chemical transformations, a converter providing a reaction chamber and a chamber for fluids thereabove, a partition separating said chamber but permitting passage of fluid, a contact mass in said reaction chamber, heating or cooling means for said partition comprising a container for fluid above said partition having depending coils or loops in contact with the latter, and a layer of heat insulating material on the upper face of said partition enclosing said means.

19. A converter for effecting chemical reactions comprising a case, spaced partitions within said case defining a reaction chamber, a contact mass in said chamber, tubular members mounted on both said partitions and extending into said chamber, and means for applying heat substantially uniformly to all parts of one of said partitions, including an element in contact with one face of said partition receiving a temperature modifying medium other than those fed to or issuing from said reaction chamber.

20. A converter for effecting chemical reactions comprising a case providing a reaction chamber and an adjacent chamber for fluids, a partition separating said chambers but providing passage for fluid between said chambers, a contact mass in said reaction chamber, tubular members mounted on said partition and extending into said mass, a temperature modifying element adjacent said partition, means including said element in a circuit for a fluid medium, and means in said circuit operable at will for heating or for cooling said medium.

21. A converter for effecting chemical reactions comprising a case providing a reaction chamber and an adjacent chamber for fluids, a partition separating said chambers but providing passage for fluid between said chambers, a contact mass in said reaction chamber, a temperature modifying element adjacent said partition, and means combining said element into a circuit for containing a fluid medium operable either to heat or to cool said partition, the circuit formed by said means including two sections and controls for by-passing either of said sections, one section having a heater for said fluid medium, the other section having a cooler or condenser for said medium and a pump for circulating the latter.

22. In apparatus for effecting chemical transformations, a converter providing a reaction chamber and an adjacent chamber for fluids, a partition separating said chambers, a contact mass in said reaction chamber, and independently controlled means for modifying the temperature of the outer walls of said converter and of said partition, including a temperature modifying element in direct contact with numerous points distributed over the area of said partition and means insulating said temperature modifying element from heat exchange with the aforesaid chamber which is adjacent to said reaction chamber.

23. A converter for effecting chemical reactions comprising a case providing a reaction chamber for containing a contact mass and an adjacent chamber for fluids, a partition separating said chambers but providing passage for fluid between said chambers, means associated with the side of said partition remote from said reaction chamber for checking heat exchange between said chambers, a temperature modifying element in direct contact with said partition, and means for automatically controlling the operation of said element including temperature responsive means in said reaction chamber near said partition.

24. A converter for effecting chemical reactions comprising a case, spaced partitions adjacent opposite ends of said case for defining a reaction chamber, a contact mass in said chamber, perforated fluid distributing members mounted on one of said partitions and extending into said mass toward said other partitions, means for applying heat to that portion of the outer wall of said case which encloses said reaction chamber, and independent means for applying heat to one of said partitions.

25. A converter for effecting chemical reactions comprising a case providing a reaction chamber and an adjacent chamber for fluids, a partition separating said chambers but permitting passage of fluid, a contact mass in said reaction chamber, differential means for modifying the temperature of the portions of the contact mass adjacent said partition and the outer wall of said case including elements in heat-exchange relation with said partition and said outer wall, and automatic means responsive to temperature changes in said contact mass for controlling said differential means.

26. A converter for effecting chemical reactions providing a reaction chamber and an adjacent chamber for fluids, a partition separating said chambers, a contact mass in said reaction chamber, perforated fluid distributing members mounted on said partition and extending into said mass, an electrical element for applying heat to a portion of the outer wall of said converter enclosing said reaction chamber, an electrical element for applying heat to said partition, and means for controlling the operation of said elements.

27. A converter for effecting chemical reactions comprising a case, spaced partitions adjacent opposite ends of said case for defining a reaction chamber, a contact mass in said chamber, an electrical element for applying heat to a portion of the wall of said case enclosing said reaction chamber, an electrical element for applying heat to one of said partitions, and automatic means responsive to temperature changes in the contact mass adjacent said elements for controlling the operation of said elements.

28. A converter for effecting chemical reactions comprising a case providing a reaction chamber and an adjacent chamber for fluids, a partition separating said chambers but permitting passage of fluid, a contact mass in said reaction chamber, means for applying heat to that portion of the outer wall of said case which encloses said reaction chamber, and means utilizing a fluid operating in a closed circuit for transferring a portion of the heat of said means to said partition.

29. A converter for effecting chemical reactions comprising a case, spaced partitions adjacent opposite ends of said case for defining a reaction chamber, a contact mass in said chamber, means for circulating hot gases over the wall of said case enclosing said reaction chamber, and means utilizing a different fluid medium to transfer the heat of said gases to one of said partitions comprising a coil in contact with said last named partition and a heater coil disposed in the stream of said hot gases, both said coils being interconnected to form a closed circuit.

30. A converter for effecting chemical reactions providing a reaction chamber and an adjacent chamber for fluids, a partition separating said chambers, a contact mass in said reaction chamber, perforated fluid distributing members mounted on said partition and extending into said mass, means for circulating a hot medium over the wall of said converter enclosing said reaction chamber, and means utilizing another fluid medium to transfer heat from said hot medium to said partition comprising an element in contact with said partition and a second element in circuit with said first element and disposed in heat exchange relation with said hot medium.

THOMAS B. PRICKETT.